United States Patent [19]

Kenworthy

[11] 4,040,534
[45] Aug. 9, 1977

[54] BALED HAY LOADING AND TRANSPORT DEVICE

[75] Inventor: John B. Kenworthy, Ottumwa, Iowa

[73] Assignee: Hay Handling Equipment Company, Des Moines, Iowa

[21] Appl. No.: 631,148

[22] Filed: Nov. 11, 1975

[51] Int. Cl.² .............................................. A01D 87/12
[52] U.S. Cl. ................................ 214/766; 214/701 R; 214/DIG. 4
[58] Field of Search ............... 214/130 C, 144, 701 R, 214/701 Q, 766, 768, DIG. 1, DIG. 3, DIG. 4, DIG. 12; 172/439, 445, 448; 180/53 C

[56] References Cited

U.S. PATENT DOCUMENTS

| 3,086,670 | 4/1963 | Cuendet | 214/701 R |
| 3,198,357 | 8/1965 | Shelby | 214/766 |
| 3,825,140 | 7/1974 | Smith | 214/768 |
| 3,880,305 | 4/1975 | Van Polen | 214/147 G |
| 3,934,726 | 1/1976 | Martin | 214/147 R X |

FOREIGN PATENT DOCUMENTS 1,178,332   1/1970   United Kingdom ................ 214/768

Primary Examiner—L. J. Paperner
Attorney, Agent, or Firm—Zarley, McKee, Thomte, Voorhees & Sease

[57] ABSTRACT

A vertically positioned frame member is connected to the tractor lift arms and to a hydraulic stabilizer arm. A hay-carrying arm is pivotally connected to the frame and includes a trio of rearwardly extending hay-engaging fingers. The hydraulic cylinder extends from the frame to the hay-carrying arm to raise and lower the hay-carrying arm. The hydraulic stabilizer arm allows for tilting of the frame and the bale of hay for loading and unloading.

6 Claims, 6 Drawing Figures

BALED HAY LOADING AND TRANSPORT DEVICE

BACKGROUND OF THE INVENTION

Bale handling machines heretofore have only had the capability of transporting a bale of hay from one location to another. Accordingly, what these machines lacked is the capability of raising and lowering the bale of hay sufficiently to load and unload from trailers, wagons, trucks and the like. Operation of a conventional three-point hitch will not raise a bale of hay sufficiently to satisfy this objective.

SUMMARY OF THE INVENTION

The raising and lowering of a bale of hay is accomplished by the combination of lifting actions produced by the lift arms of a three-point hitch on a tractor and the rotational movement of a hay-carrying arm on the hay handling device frame. Any desired height may be reached through this combination of lifting actions and each of them may be operated separately or together as desired. Furthermore, the tilting of the bale of hay may be quickly accomplished through operation of the hydraulic cylinder functioning as a stabilizer arm between the handling device frame and the tractor.

DESCRIPTION OF THE PREFERRED EMBODIMENT

Figures 1, 2:
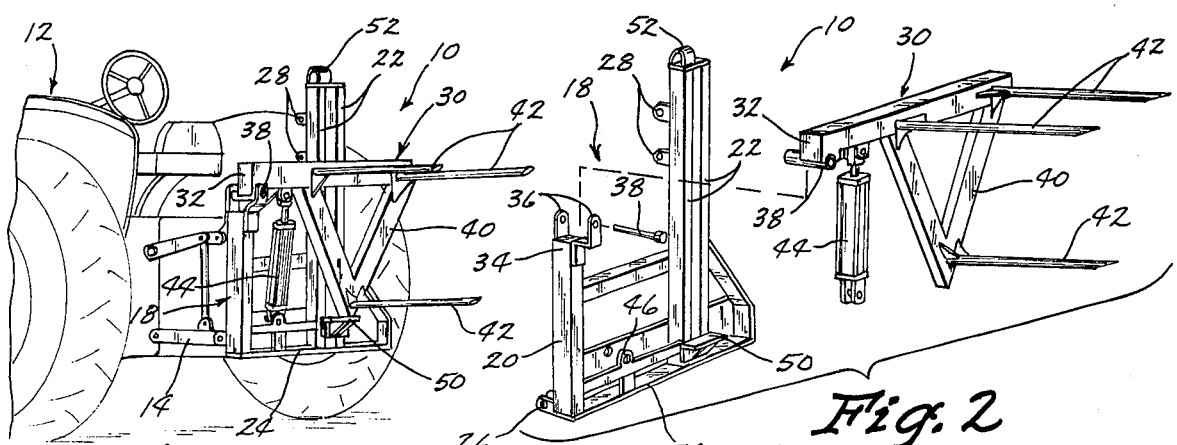
FIG. 1 is a rear perspective view of the hay loading and transport device on the three-point hitch of a tractor.
FIG. 2 is an exploded perspective view of the hay loading and transport device separate and apart form the tractor.
Figure 3:
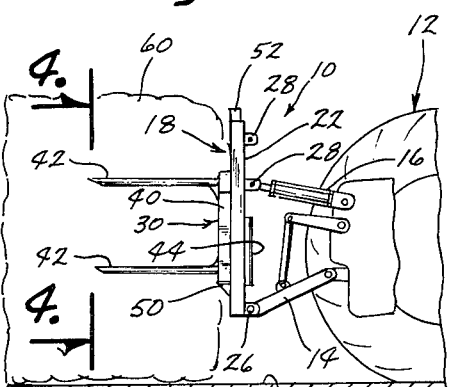
FIG. 3 is a fragmentary side elevation view of the device engaging a bale of hay on the ground.

The hay handling device of this invention is referred to generally by the reference numeral 10 in FIG. 1 and is shown mounted on a tractor 12. The tractor has lower lifting arms 14 and an upper hydraulic cylinder stabilizer arm 16.

The hay handling device 10 includes, as seen in FIG. 2, a frame 18 comprising a pair of upstanding post members 20 and 22 interconnected by a bottom cross member 24. The bottom cross member has mounting brackets 26 pivotally engaging the lifting arms 14. The hydraulic cylinder stabilizer arm 16 selectively engages either of a pair of apertured ears 28 on the upstanding member 22.

A bale-carrying arm 30 is pivoted at its inner end 32 to the upper end 34 of the post 20 having upstanding apertured ears 36 for embracing a sleeve 38 on the lower side of the carrying arm 30. A pin 38 is received in the sleeve 38 and the apertures of the ears 36. A V-shaped frame portion 40 is carried on the bottom side of the carrying arm 30 and forms with the carrying arm a triangular shape. A hay-engaging finger 42 is provided at each corner of the triangular shaped hay carrying arm 30. A hydraulic cylinder 44 extends between the hay-carrying arm 30 remotely of its pivot axis through the pin 38 to the cross member 24 where it is conected thereto by an upstanding bracket 46.

Figure 4:
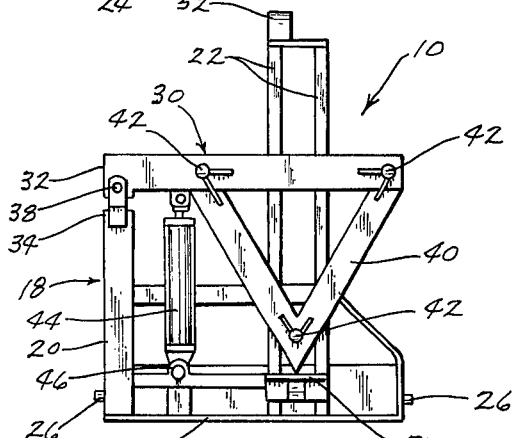
FIG. 4 is a cross sectional view taken along line 4 – 4 in FIG. 3.
Figure 5:
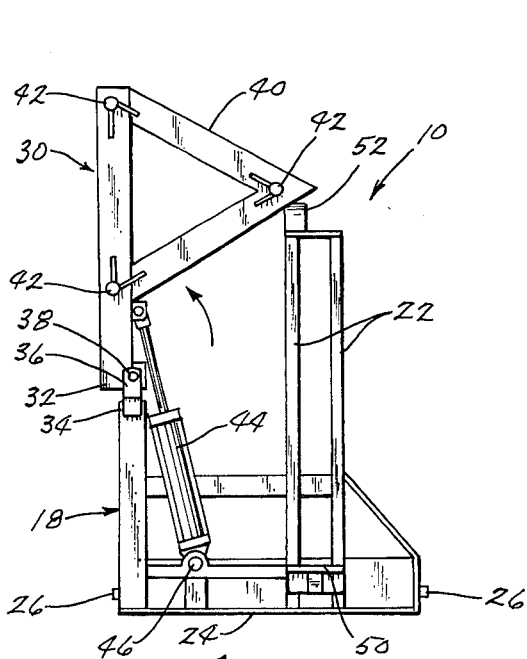
FIG. 5 is a view similar to FIG. 4 but showing the hay-carrying arm in its raised position.

A stop plate 50 is provided on the cross member 24 to limit downward travel of the hay-carrying arm 30. An upstanding rounded guide element 52 is positioned on the upper end of the upstanding post 22 to assure that the arm 30 is guided back down along the rear side of the upstanding post 22 as it is moved between its raised position of FIG. 5 and its lower position of FIG. 4.

Figure 6:
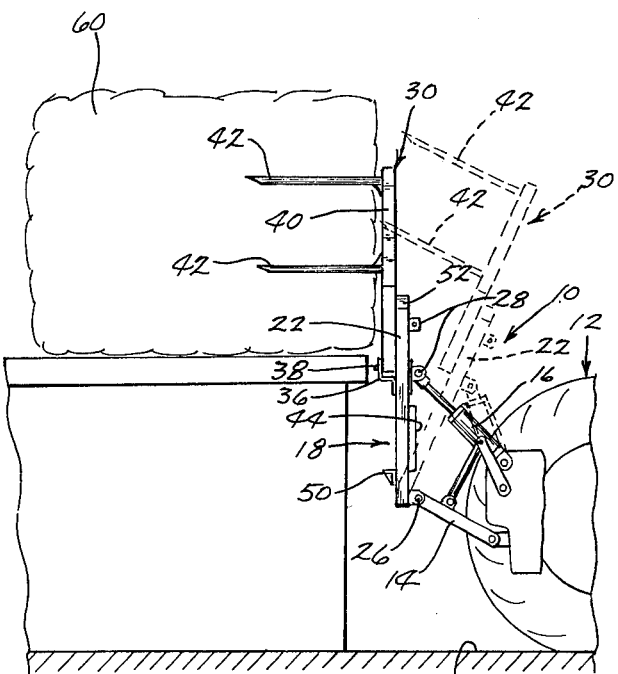
FIG. 6 is a side elevation view of the hay loading and transport device illustrating a bale of hay in its raised position.

Thus in operation it is seen that a bale of hay 60 on the ground 62 is engaged by the hay-engaging fingers 42 by the tractor being backed rearwardly into the bale of hay. The fingers have been previously positioned at the desired vertical height by operation of the lift arms 14. The hay-carrying arm 30 would normally be in its lowered position of FIG. 4. The fingers 42 would normally be substantially horizontal and this may be established by operation of the stabilizer hydraulic cylinder 16. The lift arms 14 are then operated to raise the bale 60 off of the ground and if only transporting of the bale of hay is required it may be only necessary to tilt the frame 18 forwardly towards the tractor to maintain the bale of hay 60 on the fingers 42, however, if it is desired to raise the bale 60 higher than the lift arm 14 will raise it then further lifting action may be accomplished by operation of the power cylinder 44 which will cause the hay-carrying arm 30 to be pivoted to its upward position illustrated in FIGS. 5 and 6. The bale will be lowered onto a desired elevated platform surface by lowering of the hydraulic cylinder 44 or the lift arms 14. Tilting rearwardly and downwardly of the frame 18 will further facilitate removal of the hay from the fingers 42.

I claim:

1. A baled hay handling vehicle for transporting and elevating round hay bales comprising,
   a tractor vehicle having a pair of lifting arms and a stabilizer arm,
   a hay handling device frame having front and rear sides with mounting means on the front side connected to said tractor vehicle lifting and stabilizer arms for raising and lowering said device,
   a hay-carrying arm pivotally connected to the rear of said frame for pivotal movement in a plane parallel to said frame,
   a hay-engaging finger on said hay carrying arm extending perpendicular to said arm and rearwardly of said frame, and
   pivoting means engaging said hay-carrying arm for pivoting said hay carrying arm between raised and lowered positions to elevate a bale of hay above the pivotal axis of said arm whereby said hay bale may be elevated to a height equal to the combined elevating capabilities of said tractor lifting arms and said pivoting means for pivoting said hay carrying arm.

2. The structure of claim 1 wherein said pivoting means is a hydraulic cylinder extending between said hay-carrying arm and said frame.

3. The structure of claim 2 wherein said frame includes spaced apart upstanding frame members and said hay-carrying arm is pivoted to one of said frame members and said other frame member is positioned to engage said hay-carrying arm and limit movement of said hay-carrying arm in a plane perpendicular to the plane of said frame.

4. The structure of claim 3 wherein a stop is provided on said frame to limit downward pivotal movement of said hay-carrying arm.

5. The structure of claim 4 wherein said hay-carrying arm includes a trio of hay-engaging fingers spaced in a triangular relationship, said first mentioned finger being included in said trio of fingers.

6. The structure of claim 1 wherein said stabilizer arm is a hydraulic cylinder for varying the angle of said frame relative to a vertical plane.

* * * * *